Nov. 21, 1967  F. BERRY  3,353,455

FLUID PRESSURE MOTOR

Filed Sept. 20, 1965  3 Sheets-Sheet 1

INVENTOR:
FRANK BERRY

JOHN F. SCHMIDT
ATTORNEY

Nov. 21, 1967  F. BERRY  3,353,455
FLUID PRESSURE MOTOR
Filed Sept. 20, 1965  3 Sheets-Sheet 2

INVENTOR:
FRANK BERRY
BY
JOHN F. SCHMIDT
ATTORNEY

Nov. 21, 1967  F. BERRY  3,353,455
FLUID PRESSURE MOTOR
Filed Sept. 20, 1965  3 Sheets-Sheet 3
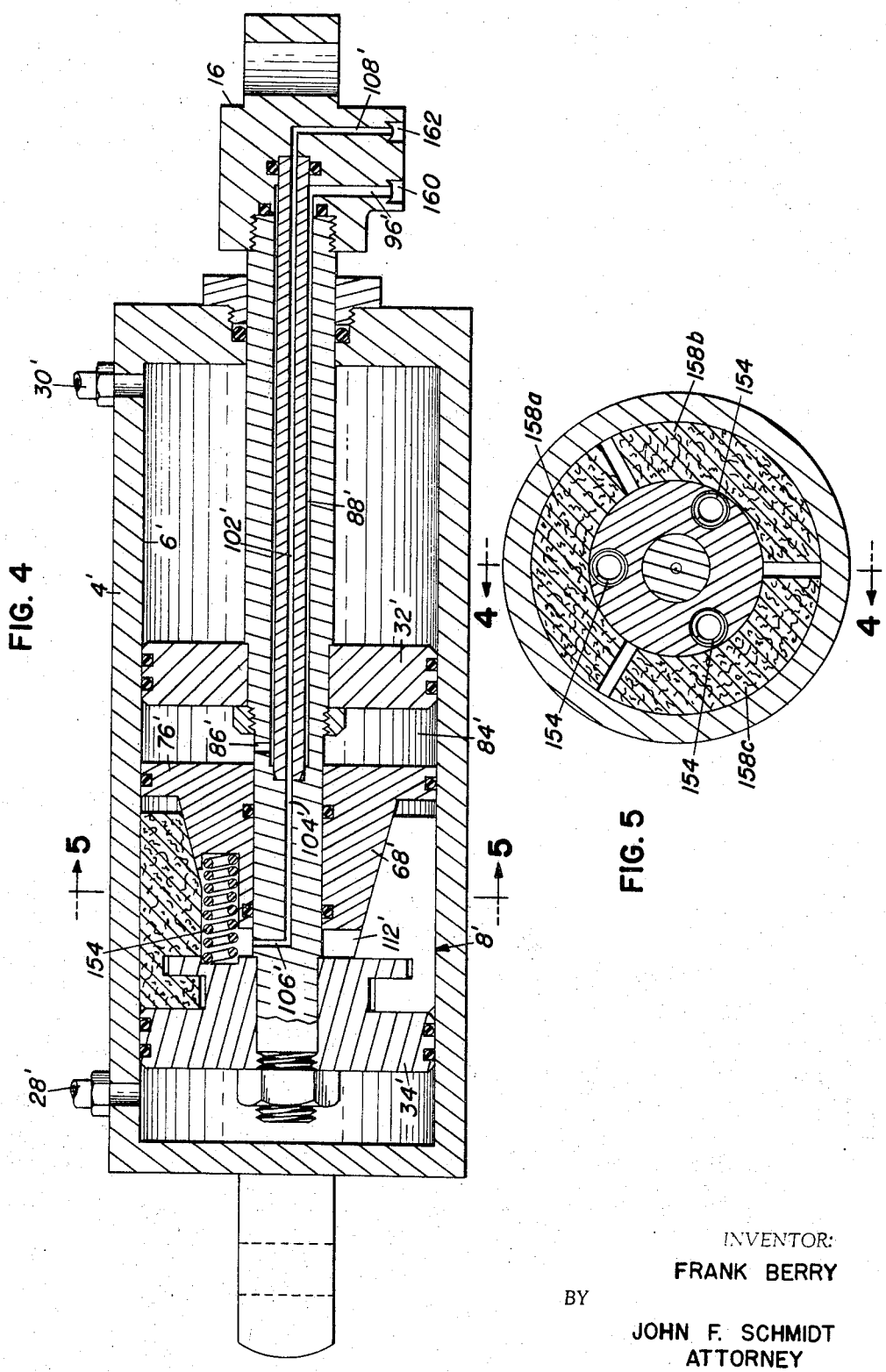
INVENTOR:
FRANK BERRY
BY
JOHN F. SCHMIDT
ATTORNEY

United States Patent Office 3,353,455
Patented Nov. 21, 1967

3,353,455
FLUID PRESSURE MOTOR
Frank Berry, Corinth, Miss., assignor to Westinghouse Air Brake Company, a corporation of Pennsylvania
Filed Sept. 20, 1965, Ser. No. 488,532
4 Claims. (Cl. 92—24)

ABSTRACT OF THE DISCLOSURE

A self-locking fluid pressure motor including a piston movably mounted in a cylinder, the piston including first and second piston parts axially spaced on a piston rod having first and second conduits therein. A spring loaded cam is movably mounted on the rod between the piston parts and defines therewith first and second chambers in fluid communication with the first and second conduits. A cam follower is axially fixed relative to the piston parts and is adapted to be moved into locking contact with the inner periphery of the cylinder by the cam. In one embodiment the cam is spring loaded to the lock position and in a second embodiment the cam is spring loaded to the unlock position.

---

This invention relates to fluid pressure motors of the piston-and-cylinder type, and especially to such motors as possess inherent capability of locking against accidental or unwanted movement.

There are numerous applications in fluid pressure equipment which require a motor that can be locked in any desired position, and there are motors which fill such a need. However, motors of the types currently available to accomplish the desired purpose are too complex, too expensive, and not sufficiently reliable. It is accordingly an object of this invention to provide a fluid pressure motor of the piston-and-cylinder type in which the motor can be locked against accidental movement; in a more specialized form of application, the object is to provide a motor which locks itself against movement just as fluid pressure to the motor is shut off.

The foregoing and other objects are accomplished in a fluid pressure motor of the piston-and-cylinder type in which a piston carries a member which makes frictional engagement with the cylinder in order to lock the piston against movement in the cylinder when assurance against such movement is desired. In a preferred form of the invention, the piston comprises two parts which are spaced apart on a piston rod, and a lock member which is capable of frictional engagement with the cylinder and occupies the space between the two piston parts. The lock member is also a cam follower, and is engaged by a cam surface which is operated into one position by spring pressure and into another position by fluid pressure, one of the operating positions being a locked position and the other operating position being an unlocked position.

In the drawings:

FIG. 4 is a view similar to FIG. 1, being a section on line 4—4 of FIG. 5, and showing another embodiment of the invention; and FIG. 5 is a view in section substantially on line 5—5 of FIG. 4.

Figure 1:
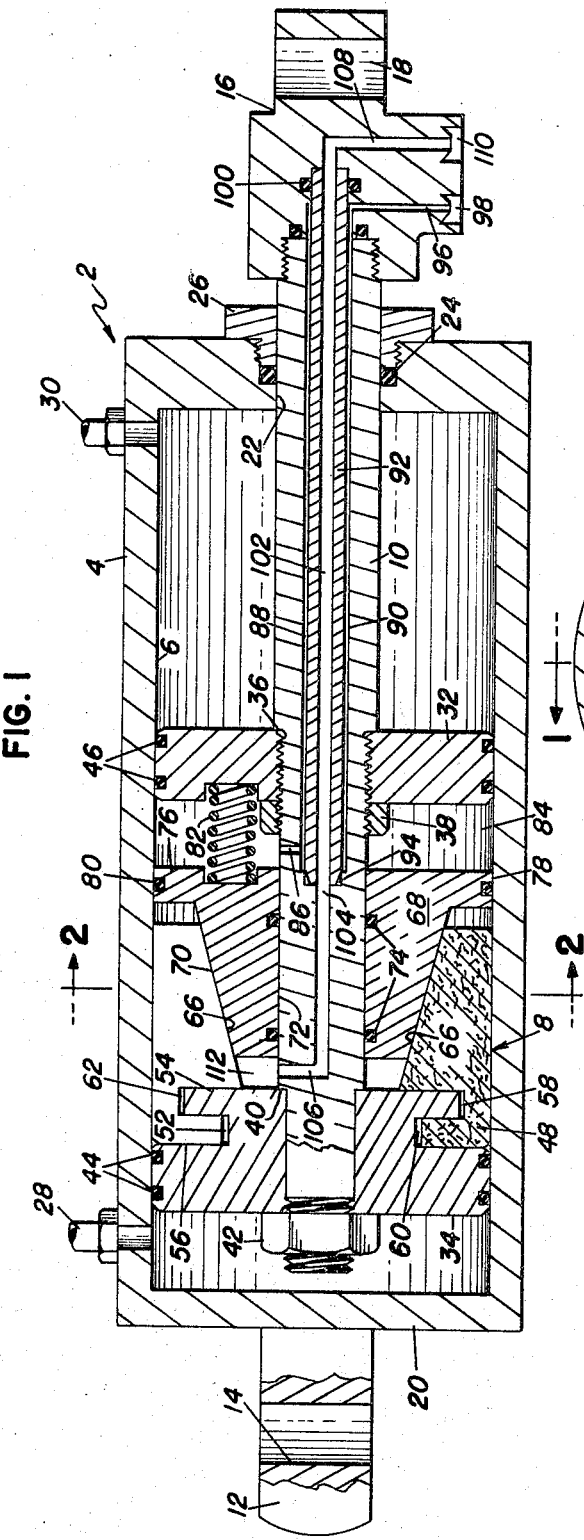
FIG. 1 is a longitudinal sectional view through a piston and cylinder motor of the type described, being a view in section substantially on line 1—1 of FIG. 2.
Figure 2:
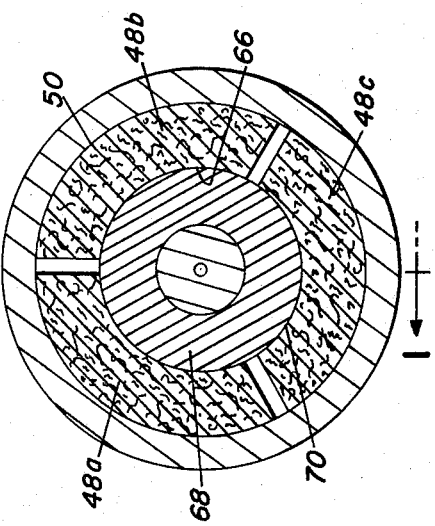
FIG. 2 is a view in section substantially on line 2—2 of FIG. 1.

Referring now in detail to FIGS. 1 and 2 of the drawing for a detailed description of the embodiment there shown, a piston and cylinder motor of the type described is indicated generally at 2 and comprises a cylinder 4 having an internal bore 6, a piston indicated generally at 8, and a piston rod 10. As is conventional in fluid pressure motors of this type, piston 8 is secured on piston rod 10 as will be described in greater detail below. The cylinder 4 is provided with an attachment coupling 12 having a bored hole 14. Piston rod 10 is provided with an attachment coupling 16 having a bored hole 18.

Cylinder 4 is closed at the left end as seen in FIG. 1, more specifically as shown at 20, and at its opposite end it is provided with an opening 22 through which piston rod 10 moves as piston 8 carried by rod 10 reciprocates back and forth in the cylinder. Opening 22 is suitably packed as shown at 24, the packing held in the place by a packing gland 26. Fluid under pressure is supplied to or withdrawn from the left end of the cylinder through a fluid conduit 28; fluid under pressure is supplied to or withdrawn from the opposite end of the cylinder through a fluid conduit 30.

Piston 8 comprises a first piston part 32 and a second piston part 34 spaced therefrom, both piston parts being secured in any suitable way against axial movement on piston rod 10. Thus, piston part 32 is internally threaded to cooperate with a threaded portion on the stepped piston rod 10, bearing against a shoulder 36 on the piston rod and being secured tight against shoulder 36 by a lock nut 38. Piston part 34 is held tight against a shoulder 40 on rod 10 by a lock nut 42 having threaded engagement with the end of the piston rod 10. Both piston parts 32 and 34 are peripherally packed in any suitable manner, as shown at 44 and 46.

The piston part 34 is spaced from piston part 32 as aforesaid, and the space between the two parts 32 and 34 is occupied by the lock mechanism. Thus, a lock member shown in section at 48 is preferably, as best seen in FIG. 2, made up of three parts, 48a, 48b and 48c. The three-part lock member is preferably, at least at its cylindrical surface 50, of a material which will make good frictional engagement with the cylindrical bore 6 of cylinder 4 without damaging the surface finish. The lock member is secured against axial movement relative to piston rod 10 and the first and second piston parts 32 and 34 by means of a tongue-and-groove structure. In the embodiment here shown, the tongue-and-groove structure involves piston part 34 which is provided with a peripheral groove 52 and a flange 54 which extends radially outward. Correspondingly, a flange 56 on the three-part lock member extends radially inward into groove 52, and annular groove 58 in the three-part lock member 48 is designed to accommodate the flange 54. It will of course be understood that the planes of the surfaces formed by the flanges 54 and 56 and the cooperating grooves are parallel and are perpendicular to the axis of the cylinder in order to permit radial movement of the lock member (consisting of parts 48a, 48b and 48c) relative to the piston rod and piston part 34. To permit a suitable amount of such radial movement, the groove 52 is deeper than the flange 56, and groove 58 is deeper than flange 54. The toroidal space thus provided is shown in FIG. 1 at 60 and 62 respectively.

Reference was made above to the cylindrical surface 50 of the three-part lock member, surface 50 being suited to frictional engagement of the bore 6 of cylinder 4. As can be seen in FIG. 2, surface 50 on the three-part lock member is an external surface, and in the embodiment shown is cylindrical. The three-part lock member is provided with an internal conical surface shown at 66 of FIGS. 1 and 2. Conical surface 66 serves as a camming surface, so that the internal portions of the three pieces provided with the conical surface become cam followers operated by a cam to be described in detail below.

The cam referred to above is shown at 68 and is provided with an external conical surface 70 which is engageable with the conical surface 66 of the lock member. Cam 68 is freely slidable on piston rod 10 because of a central bore 72, suitably packed as shown at 74. At its right end as seen in FIG. 1, cam 68 carries a radial flange forming a third piston part 76 having an external cylindrical surface 78 cooperable with bore 6 of cylinder 4 and suitably packed as shown at 80 against leakage of fluid between the two faces of piston part 76. Helical springs, one of which is shown at 82, are preferably disposed between first piston part 32 and third piston part 76 with the axis of the springs parallel to the axis of piston rod 10. The space 84 between piston part 32 and piston part 76 is vented to a fluid reservoir by means of a radial passage 86, an annular space 88 formed by the bore 90 of piston rod 10 and a tube 92 having a smaller outside diameter than the bore 90. Tube 92 is beveled as shown at its left end 94 as an aid to centering the tube 92 in the bore 90. Annular space or passage 88 is connected with a radial passage 96 in attachment coupling 16. Any suitable fluid coupling means may be used to engage a bore 98 in the external cylindrical surface of attachment coupling 16, bore 98 being connected by such fluid conduit with a fluid reservoir, as will be described below.

At the right end of tube 92, the tube engages a suitably packed bore in attachment coupling 16, the packing being shown at 100. The left end of bore 102 of tube 92 communicates with a bore 104 in piston rod 10 and bore 104 communicates with a radial bore 106. Passages 106, 104, 102, and radial passage 108 in attachment coupling 16 serve to communicate a bore 110 in the attachment coupling surface with the space 112 between cam 68 and piston part 34, so that space 112 can be connected with a source of fluid under pressure by means of any suitable fluid conduit connecting with bore 110.

Figure 3:
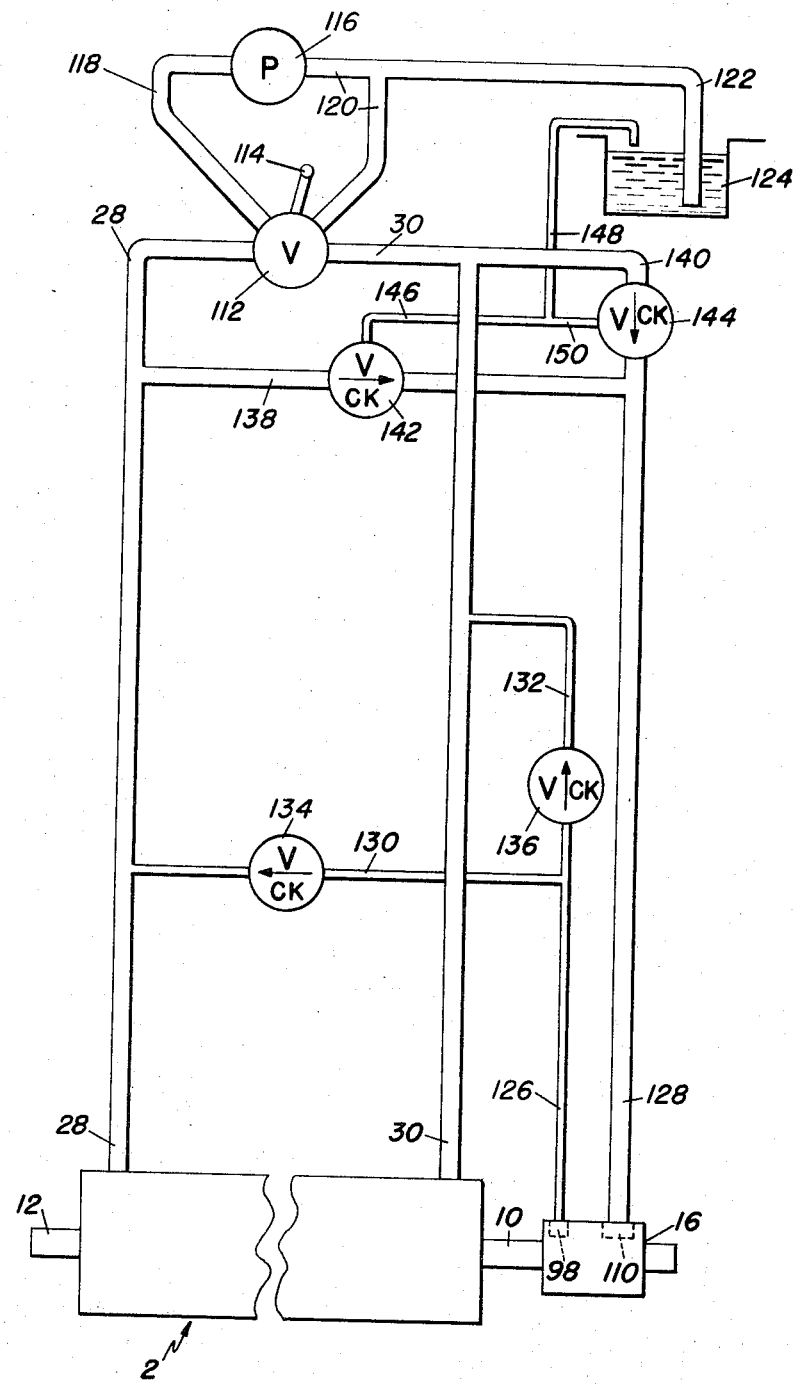
FIG. 3 is a view showing a fluid pressure circuit in which a motor made according to this invention is connected for operation.

Reference will now be made to FIG. 3 for a description of a fluid pressure circuit in which a motor of the type disclosed and claimed may be used. In the circuit diagram shown in FIG. 3, the fluid conduits 28 and 30 shown in FIG. 1 as being connected with opposite ends of cylinder 4 are shown as connected with a control valve 112 having an operating handle 114. Valve 112 may be a standard commercial valve of any suitable type so designed that either of the conduits 28 or 30 may be connected to receive fluid under pressure while the other conduit is connected to return fluid to the reservoir or tank. Toward this end, a fluid pump 116 having delivery and intake ports is connected to supply fluid under pressure to valve 112 by means of a fluid conduit 118 and is connected by means of a fluid conduit 120 to receive fluid from valve 112; a branch conduit 122 connects fluid conduit 120 with a tank or reservoir 124.

FIG. 1 shows an attachment coupling 16 on piston rod 10. Attachment coupling 16 is provided with bores 110 and 98 which are shown in dotted lines in FIG. 3. The bore 98 is connected with a fluid conduit 126, while bore 110 is connected with a fluid conduit 128. Fluid conduit 126 is provided with branches 130 and 132. Branch 130 is provided with a check valve 134 and connects with conduit 28; branch 132 is provided with a check valve 136 and is connected with fluid conduit 30. Fluid conduit 128 is connected with branch conduits 138 and 140 in which check valves 142 and 144 respectively are provided to permit fluid flow from conduits 28 and 30 respectively to the bore 110 in attachment coupling 16.

The low pressure side of each of check valves 142 and 144 is provided with a bleed hole which is connected with tank 124. Thus, the bleed hole of check valve 142 is connected by means of conduits 146 and 148 with tank 124, and the bleed hole of check valve 144 is connected with tank 124 by means of conduits 148 and 150.

*The embodiment of FIGS. 4 and 5*

In the embodiment of the invention shown in FIGS. 4 and 5, the self-locking hydraulic motor shown in FIGS. 1 and 2 is modified to provide for the application of spring pressure and fluid pressure in directions opposite to the directions for the application of those forces in FIG. 1. Thus, a plurality of helical springs 154 can be disposed between the second piston part 34' and the third piston part 76' so as to urge the cam 68' toward the right as seen in FIG. 4 and away from engagement with the conical surface of the cam follower provided by the internal conical surface of the three-part lock member here shown as 158a, 158b and 158c.

In the embodiment shown in FIGS. 4 and 5, the space 112' between second piston part 34' and third piston part 76' is vented to the tank by means of radial bore 106', central passages 104' and 102', and radial passage 108' in attachment coupling 16. The space 84' between first piston part 32' and third piston part 76' is connected by means of radial passage 86', annular passage 88', and radial bore 96' with a bore 160 in the external surface of attachment coupling 16. Radial bore 108' connects with a bore 162 in the attachment coupling.

As in the motor shown in FIG. 1, the cylinder 4' shown in FIG. 4 is connected at its left end with a fluid conduit 28' and at its right end with a fluid conduit 30' in order to admit fluid under pressure to either the left side of the piston indicated generally at 8' or the right side of the piston in order to reciprocate the piston in the internal bore 6' of cylinder 4'.

OPERATION

*Embodiment shown in FIGS. 1–3*

Reference will now be made to FIGS. 1–3 for an understanding in detail of the operation of the embodiment of the invention there shown. With no pressure on either of the conduits 28 and 30, the springs, one of which is shown at 82, push the cam 68 to the left so that the cam surface 70 (an external conical surface) bears against the internal conical surface 66. Thus, cam 68 bears against the cam follower which consists of the three parts 48a, 48b and 48c, camming these three parts of the lock member radially outward and into frictional engagement with the bore 6 of the cylinder. Thus the piston indicated generally at 8 is held against movement in the bore 6.

Now let it be assumed that handle 114 of valve 112 is moved so as to connect pressure conduit 118 with conduit 28 and at the same time connect return conduit 120 with conduit 30. Fluid under pressure thereupon enters the left end of cylinder 4 as seen in FIG. 1. At the same time, the fluid in branch line 138 is submitted to pressure and fluid can flow to conduit 128 through check valve 142. Conduit 128 is connected with bore 110 in the attachment coupling 16, so that fluid under pressure flows through radial passage 108, central passages 102 and 104, and radial passage 106 into the space 112 between third piston part 76 and second piston part 34. Fluid under pressure thereupon pushes cam 68 away from the internal surface 66 of the cam followers against the bias of helical spring 82. It will be noted that space 84 is vented to the reservoir through radial passage 86, annular passage 88, radial passage 96, bore 98 in the surface of attachment coupling 16 and conduit 126, which connects with conduit 30 through check valve 136. Because of the higher pressure on the left face of third piston part 76, third piston part 76 and cam 68 are pushed to the right as seen in FIG. 1, permitting the lock member consisting of the three parts 48a, 48b and 48c to disengage themselves from the surface of cylinder bore 6. The pressure at the left end of the cylinder is thereupon effective against the face of second piston part 34 and moves the entire piston 8 toward the right as seen in FIG. 1.

As piston 8 moves to the right as seen in FIG. 1, fluid discharges from the right end of cylinder 4 by way of conduit 30, the appropriate passages in valve 112, and conduit 120 to the pump or to the tank, depending on the demand for fluid at the pump inlet. It will of course be understood that the quantity of fluid discharged through conduit 30 will be less than the quantity going into the cylinder by way of conduit 28 because of the volume taken up by piston rod 10. Accordingly, if there are no other connections with the pump 116, pump 116 will draw fluid from conduit 120 and conduit 122 in order to supply the total volume required for the left end of cylinder 4.

As soon as handle 114 of valve 112 is moved to a different position so that conduit 28 is no longer connected with fluid under pressure, the pressure in conduit 128 will begin to bleed off through the bleed ports in check valves 142 and 144, to tank 124 by way of conduits 146, 150 and 148.

Now if pressure is applied to conduit 30 by manipulation of valve 112 so as to connect conduit 30 with conduit 118, then of course the same sequence of events as decribed above takes place in connection with the parts of the lock mechanism between first piston part 32 and second piston part 34. The difference now, as will be understood by those skilled in the art, is that fluid under pressure will move through conduit 30 to the right end of cylinder 4 and out of cylinder 4 at its left end, through conduit 28. During this phase of the operation, conduit 128 is supplied with fluid under pressure through check valve 144 and branch conduit 140. Conduit 126 at this time will be connected with tank 124 through branch conduit 130, check valve 134, conduit 28, valve 112, and conduits 120 and 122. At this time, there will be a net gain of pressure fluid discharged to conduit 122 because the volume leaving the cylinder will be greater than the volume going into the cylinder, so that there will be a net flow of fluid at approximately atmospheric pressure into the tank 124, assuming no other connections with the conduits shown in FIG. 3.

*The embodiment of FIGS. 4 and 5*

As will be understood from the foregoing description of the operation of the embodiment shown in FIGS. 1 and 2, those skilled in the art will understand that the springs 154 in FIGS. 4 and 5 bias the cam 68' away from the cam follower of the three parts 158a, 158b and 158c, so that the fluid pressure motor shown in FIG. 4, with no fluid conduit under pressure but with all lines vented to the tank, will be in a free floating condition because the three-part lock member will be in its unlocked position. It will of course be understood that the fluid pressure motor shown in FIGS. 4 and 5 cannot be connected in a circuit such as that shown in FIG. 3, because fluid under pressure applied to bore 160, passage 96', annular passage 88', and radial passage 86' to the space 84' would only serve to lock the piston against movement, so that nothing would be accomplished by pressurizing the self-locking device at the same time that fluid under pressure is admitted to one end or the other of the cylinder. Accordingly, the fluid pressure motor shown in FIGS. 4 and 5 will be used in applications wherein a separate pilot pressure will be applied to the bore 160 whenever it is desired to hold the piston 8' against movement in the cylinder.

It will be apparent to those skilled in the art that the drawings show the motor of FIGS. 1 and 2 in a hydraulic application. It should be pointed out that the advantages of fluid motors made according to this invention may be even greater for air motors than for hydraulic. Hydraulic motors can be satisfactorily locked against movement, in many applications, simply by trapping the hydraulic fluid in the cylinder, but this might be insufficient for air motors because of the compressibility of air. A motor of the type here disclosed, in an air system, would of course be locked securely against accidental movement.

It will be apparent from the foregoing that this invention provides a self-locking fluid pressure motor of the piston and cylinder type which will be relatively inexpensive to manufacture and will be positive and direct in its operation. Other advantages will be apparent to those skilled in the art.

While there are in this application specifically described a plurality of forms which the invention may assume in practice, it will be understood that these forms are shown for purposes of illustration and that the invention may be modified and embodied in various other forms without departing from its spirit or the scope of the appended claims.

What is claimed is:
1. A fluid pressure motor comprising an elongated cylinder having a bore closed at one end and open at the opposite end:
   a piston and rod assembly movably positioned in said bore and defining therewith head and rod chambers;
   a first conduit in fluid communication with at least one of said head and rod chambers, said assembly including a piston rod movable in the bore through said open end, said piston rod including second and third conduits;
   a first piston part secured against axial movement relative to the rod;
   a second piston part axially spaced from the first piston part and also secured against axial movement relative to the rod;
   a cam follower between the piston parts fixed against longitudinal movement relative to the rod and radially movable into and out of frictional engagement with said bore;
   a cam having an operating position in which it operatively engages the cam follower and another operating position in which it operatively disengages the cam follower, in one position the follower being in locking frictional engagement with the bore and in other position the follower being movable in the bore;
   said cam having first and second portions cooperating with said first and second piston parts to define first and second chambers, said first and second chambers in fluid communication with said second and third conduits, respectively;
   resilient means biasing said cam into one operating position; and
   fluid pressure means to move said cam into its other operating position against the bias of the resilient means, said fluid pressure means in fluid communication with said second and third conduits.

2. A fluid pressure motor according to claim 1 wherein said cam follower comprises three elements radially movable relative to said piston and rod assembly, said elements secured against axial movement relative to said assembly.

3. A fluid pressure motor according to claim 2 wherein interlocking tongue and groove means is provided for axially securing each of said three elements to said piston and rod assembly but permitting relative radial movement therebetween.

4. A fluid pressure motor comprising an elongated cylinder having a bore closed at one end and open at the opposite end:
   a piston and rod assembly movably positioned in said bore and defining therewith head and rod chambers;
   a first conduit in fluid communication with at least one of said head and rod chambers, said assembly including a piston rod movable in the bore through said open end, said piston rod including second and third conduits;
   a first piston part secured against axial movement relative to the rod;
   a second piston part axially spaced from the first piston part and also secured against axial movement relative to the rod;
   cam and cam follower elements between the piston parts adapted to fix said piston and rod assembly against longitudinal movement relative to the cylinder, said cam follower being radially movable into and out of frictional engagement within said bore;

said cam element having an operating position in which it operatively engages the cam follower element and another operating position in which it operatively disengages the same, in one position the follower element being in locking frictional engagement within the bore and in the other position the follower element being movable in the bore;

one of said elements having first and second portions cooperating with said first and second piston parts to define first and second chambers, said first and second chambers in fluid communication with said second and third conduits, respectively;

resilient means biasing one of said elements into one operating position; and fluid pressure means to move one of said elements into its other operating position against the bias of the resilient means, said fluid pressure means in fluid communication with said second and third conduits.

References Cited

UNITED STATES PATENTS

| | | | |
|---|---|---|---|
| 435,139 | 8/1890 | Frolich | 92—28 X |
| 1,578,997 | 3/1926 | Hulshizer | 92—28 |
| 2,119,419 | 5/1938 | Clench | 92—28 |
| 2,259,815 | 10/1941 | Greve | 92—28 X |
| 2,323,731 | 7/1943 | Shetzline | 92—28 X |
| 2,515,712 | 7/1950 | Horton et al. | 92—28 X |
| 2,632,425 | 3/1953 | Grover | 92—28 |
| 3,008,454 | 11/1961 | Wilkins | 92—24 X |
| 3,182,566 | 5/1965 | Berg et al. | 92—24 |
| 3,203,513 | 8/1965 | Allen | 188—170 |
| 3,251,278 | 5/1966 | Royster | 92—18 |

FOREIGN PATENTS

| | | |
|---|---|---|
| 749,695 | 5/1956 | Great Britain. |
| 898,260 | 6/1962 | Great Britain. |

MARTIN P. SCHWADRON, *Primary Examiner.*

I. C. COHEN, *Assistant Examiner.*